United States Patent [19]

Klazinga

[11] Patent Number: 4,874,729

[45] Date of Patent: Oct. 17, 1989

[54] PROCESS FOR THE PREPARATION OF MODIFIED ZEOLITES

[75] Inventor: Aan H. Klazinga, Amsterdam, Netherlands

[73] Assignee: Shell Oil Company, Houston, Tex.

[21] Appl. No.: 180,748

[22] Filed: Apr. 12, 1988

[30] Foreign Application Priority Data

Apr. 14, 1987 [GB] United Kingdom ................. 8708961

[51] Int. Cl.$^4$ ............................................. B01J 29/08
[52] U.S. Cl. ....................................... 502/61; 502/66; 502/74; 502/79
[58] Field of Search ........................ 502/61, 66, 74, 78

[56] References Cited

U.S. PATENT DOCUMENTS

| | | | |
|---|---|---|---|
| 3,322,690 | 5/1967 | Bilisoly | 252/455 |
| 3,455,842 | 7/1969 | Cornelius et al. | 252/455 |
| 3,583,903 | 6/1971 | Miale et al. | 502/60 |
| 3,714,029 | 1/1973 | Berry | 208/111 |
| 3,806,437 | 4/1974 | Franse et al. | 204/190 |
| 3,830,725 | 8/1974 | Dolbear et al. | 208/120 |
| 4,175,057 | 11/1979 | Davies et al. | 502/61 |
| 4,357,265 | 11/1982 | Chiang | 252/455 Z |

FOREIGN PATENT DOCUMENTS 2030800 11/1970 France .
2176128 12/1986 United Kingdom .

*Primary Examiner*—Carl F. Dees

[57] ABSTRACT

Process for the preparation of a modified zeolite by treatment with a solution of one or more metal salts and a calcination which comprises treating a zeolite having an alkali oxide/aluminium oxide molar ratio between about 0.13 and about 1 with a solution of a salt of a multi-valent metal-ion having an atomic number of from about 12 to about 83 and converting it by calcination into a product having a unit cell size between about 24.21 and about 24.60 Å.

18 Claims, No Drawings

PROCESS FOR THE PREPARATION OF MODIFIED ZEOLITES

FIELD OF THE INVENTION

The present invention relates to a process for the preparation of modified zeolites and zeolites thus prepared. The zeolites produced in accordance with the present invention can be used as catalyst carriers and/or as catalysts in various fields such as hydroprocessing and catalytic cracking, in particular in various hydrocracking processes.

BACKGROUND OF THE INVENTION

The use of zeolites as catalysts and/or catalyst carriers has long been recognized and many methods to improve zeolitic base materials have been reported in the art. In the early days of zeolite research and development much attention has been devoted to physically changing the nature and possibly the properties of zeolitic base materials, e.g. by calcining, calcining under so-called selfsteaming conditions or by wet calcination. Also the treatment with ammonium-ions in various stages of the zeolite preparation procedures has been reported extensively.

It has also been reported that zeolites can be modified by treating them with certain metal salt solutions, or even metal salts themselves, in combination with various pre- and after-treatments to ensure that the zeolites are produced in the most active form.

In the course of the development of zeolites it has now been found that zeolites can be modified by treatment with certain metal-ions without requiring pre- or after-treatment with ammonium-ions. Moreover, the crystallinity of the starting material can be substantially maintained during the modification procedure.

SUMMARY OF THE INVENTION

This invention relates to a process for the preparation of a modified zeolite by treatment with a solution of one or more metal salts and a calcination which comprises treating a zeolite having an alkali oxide/aluminium oxide molar ratio between about 0.13 and about 1.0 with a solution of a salt of a multi-valent metal ion having an atomic number of from 12 to 83 and converting it by calcination into a product having an unit cell size between about 24.21 and about 24.60 Å.

DESCRIPTION OF THE PREFERRED EMBODIEMNTS

The present invention relates in particular to a process for the preparation of zeolites of the X- and Y-type. As starting materials members of the zeolite-Y family can be suitably applied such as Na-Y, as well as materials currently known as ultra-stable Y (US-Y) as well as very ultra stable Y (VUS-Y), provided that they are in the rather high alkali oxide form. Preferably, starting materials are used having a sodium oxide content between about 2 and about 15%wt. Although not necesssary, a treatment with an ammonium salt can be carried out but care should be taken not to reduce the alkali oxide/aluminium oxide molar ratio to a value below about 0.13. It is one of the advantages of the present invention that the pre-treatment with an ammonium-salt is no longer needed or needed only to a limited extent.

Suitably, the process according to the present invention is carried out using a Na-Y or a stabilized Y-zeolite such as an US-Y having a sodium oxide content between about 2.2 and about 13.5 %wt, in particular between about 2.5 and about 13 %wt. Both high sodium oxide containing materials and materials wherein part of the sodium oxide has been replaced can be suitably used as starting materials. Preferably, the process according to the present invention is carried out in such a way that the product after calcining has a unit cell size between about 24.21 and about 24.40 Å.

The zeolitic base materials to be modified according to the process according to the present invention are treated with a metal-ion salt solution of a metal having a valency of at least two and having also an atomic number ranging from about 12 to about 83. Both metalions of metals having a valency 2 and/or 3 can be used suitably. It is also possible to use metals having a higher valency, e.g. a valency of 4 as well as metals having a number of valencies of at least two.

Examples of suitable metal salt solutions comprise solutions of the following metals: magnesium, aluminum, titanium, vanadium, chromium, manganese, iron, cobalt, nickel, copper, zinc, gallium, indium, tin, lead and bismuth. Preference is given to the use of metal ions of the following metals: magnesium, aluminum, gallium, iron, copper, nickel, manganese, cobalt and zinc. In particular, metal ions of Group IIIA of the Periodic Table of the Elements can be applied in the process according to the present invention. Very good results, expressed as a low unit cell size while maintaining a substantial amount of crystallinity, have been obtained with gallium salts.

The amount of the multi-valent metal salts to be used in the process can be varied within wide ranges. It is preferred, however, to use amounts in the range of from about 0.01 to about 1.5 mole of metal salt, in particular amounts ranging of from about 0.03 to about 1.0 mole of metal salt per liter of water. Suitable metal salts comprise salts of inorganic acids such as nitrates, sulfates and halides. Preference is given to the use of nitrates and halides, in particular, chlorides. Also, salts of organic acids can be suitably applied, such as acetates and propionates. If desired, mixtures of various metal salts can be applied as well as mixtures of salts having different anions, but in general, best results will be obtained using nitrates and chlorides, in particular with gallium nitrate and aluminum chloride.

The starting zeolitic material is normally subjected to an ion-exchange treatment with a solution containing the appropriate metal salt(s). The treatment may be carried out by any technique known in the art. If desired, the treatment may be repeated a number of times. The treatment is normally carried out at a relatively low temperature, e.g. at temperatures between about 10° and about 95° C. Good results have been obtained by carrying out the ion-exchange at a temperature between about 20° and about 95° C. It will normally be carried out during a time between about 15 minutes and about 24 hours. Preference is given to a treatment time between about 30 minutes and about 6 hours.

By using the process according to the present invention, zeolite base materials can be obtained having a unit cell size between about 24.21 and about 24.60 Å, in particular between about 24.21 and about 24.40 Å, while the crystallinity of the materials is substantially maintained. Depending on the severity of the final calcination step, the crystallinity of the materials will in general be preserved above about 90% of the initial value. Normally, materials having a crystallinity of less than about 65% of the initial value are not considered to be of great interest.

After the treatment with the appropriate metal-ion salt solution, the materials thus treated will normally be subjected to drying before the final calcination. Drying is normally achieved by gentle heating of the materials at a temperature ranging from ambient to about 200° C. The drying procedure may be carried out in air or by using an inert gas such as nitrogen. Partial drying is also possible depending on the type of final calcination to be applied.

The final calcination is normally performed at a temperature in the range of from about 350° C. to about 850° C. Preference is given to a calcination temperature between about 500° C. and about 800° C., in particular between about 600° C. and about 750° C. The calcination can be performed with materials which have been dried substantially, in which case it is preferred to perform the calcination in the presence of added steam, or with materials which have been partially dried. In this latter case the addition of steam may not be necessary depending on the properties of the final material envisaged.

The calcination time may vary between wide ranges, from less than about 30 minutes to a number of hours, depending on the properties envisaged. Good results have been obtained by calcining times of about 1 to about 2 hours at a temperature between about 650° C. and about 750° C.

The zeolites modified by the process according to the present invention can be used either as catalyst carriers or as catalysts, either as is or in the form of one or more metal bearing compositions. The zeolites produced according to the present invention are particularly useful in certain hydroprocessing areas, in particular in hydrocracking. Suitable hydrocracking catalysts comprise one or more zeolites produced in accordance with the present invention together with a binder and one or more metal compounds having hydrogenating activities. Binders such as silica, alumina, silica-alumina, clays, zirconia, silica-zirconia and silica-boria can be suitably applied. Alumina is a preferred binder. Suitably about 10–95% of binder can be used in the compositions according to the present invention. Preferably, about 15–50 %wt of binder is used in the compositions.

The present invention further relates to catalyst compositions in addition to a modified zeolite and a binder, at least one hydrogenation component of a Group VI metal and/or at least one hydrogenation component of a Group VIII metal. Suitably, the catalyst compositions according to the present invention comprise one or more components of nickel and/or cobalt and one or more components of molybdenum and/or tungsten or one or more components of platinum and/or palladium.

The amount(s) of hydrogenation component(s) in the catalyst compositions suitably range between about 0.05 and about 10 %wt of Group VIII metal component(s) and between about 2 and about 40 %wt of Group VI metal component(s), calculated as metal(s) per 100 parts by weight of total catalyst. The hydrogenation components in the catalyst compositions may be in the oxidic and/or the sulfidic form. If a combination of at least a Group VI and a Group VIII metal component is present as an (mixed) oxide, it will be subjected to a sulfiding treatment prior to use in a hydrocracking process.

Feedstocks which can be suitably subjected to a hydroconversion process using catalysts based on zeolites produced in accordance with the present invention comprise gas oils, vacuum gas oils, deasphalted oils, long residues, catalytically cracked cycle oils, coker gas oils and other thermally cracked gas oils and syncrudes, optionally originating from tar sands, shale oils, residue upgrading processes or biomass. Combinations of various feedstocks can also be applied.

It may be desirable to subject part or all of the feedstock to one or more (hydro)treatment steps prior to its use in the hydrocarbon conversion process. It is often found convenient to subject the feedstock to a (partial) hydrotreatment. When rather heavy feedstocks are to be processed it may be advantageous to subject such feedstocks to a (hydro) demetallization treatment.

Suitable process conditions to be applied comprise temperatures in the range of from about 250° C. to about 500° C., pressures of up to about 300 bar and space velocities between about 0.1 and about 10 kg feed per liter of catalyst per hour (kg/1 h). Gas/feed ratios between about 100 and about 5000 Nl/kg feed can be suitably used. Preferably, the hydroconversion process is carried out at a temperature between about 300° C. and about 450° C., a pressure between about 25 and about 200 bar and a space velocity between about 0.2 and about 5 kg feed per liter of catalyst per hour. Preferably, gas/feed ratios between about 250 and about 2000 Nl/kg are applied.

The present invention will now be described by means of the following examples which are illustrative and are not intended to be construed as limiting the invention.

EXAMPLE 1

A crystalline alumino-silicate commercially available as LZ-Y-72 having a typical sodium oxide content of 2.5 %wt and a unit cell size of 24.52 Å was subjected to an ion-exchange treatment with a solution (10 ml per gram of crystalline alumino-silicate) of 0.5M gallium nitrate. The ion-exchange treatment was carried out for one hour at a temperature of 95° C. After filtration, the product obtained was washed and subjected to a drying procedure at 120° C. during 16 hours. Thereafter the product was subjected to a calcination procedure in the presence of steam for a period of one hour at 700° C. The crystalline alumino-silicate obtained contained a substantial amount of gallium. The unit cell size of the material thus obtained amounted to 24.30 Å. The crystallinity of the material obtained was at least 69% of the starting material (uncorrected for the presence of gallium).

EXAMPLE 2

The procedure as described in Example 1 was repeated using an ion-exchange treatment with 0.05M gallium nitrate which was applied twice. The unit cell size of the material obtained amounted to 24.35 Å. The crystallinity of the material obtained was at least 92% of the starting material (uncorrected for the presence of gallium).

EXAMPLE 3

The procedure as described in Example 1 was repeated using an ion-exchange treatment with 0.5M nickel nitrate. The unit cell size of the material obtained amounted to 24.37 Å. The crystallinity of the material obtained was at least 96% of the starting material.

EXAMPLE 4

The procedure as described in Example 1 was repeated using an ion-exchange treatment with 0.5M aluminum sulfate which was applied twice. The calcination procedure was carried out for one hour at 600° C. The unit cell size of the material obtained amounted to 24.36 Å and the crystallinity was completely retained.

EXAMPLE 5

The procedure as described in Example 4 was repeated using a calcination temperature of 700° C. The unit cell size of the material obtained amounted to 24.31 Å. The crystallinity of the material obtained was 97% of that of the starting material.

EXAMPLE 6

The procedure as described in Example 1 was repeated using 0.5M aluminum chloride. The unit cell size of the material obtained amounted to 24.28 Å. The crystallinity of the material obtained was 89% of that of the starting material.

What is claimed as the invention is:

1. A process for the preparation of a modified zeolite by treatment with a solution of one or more metal salts and a calcination which process comprises treating a zeolite having an alkali oxide/aluminium oxide molar ratio between about 0.13 and about 1.0 with a solution of a salt of a multi-valent metal-ion having an atomic number of from about 12 to about 83 and converting it by calcination into a product having a unit cell size between about 24.21 Å and 24.60 Å.

2. The process of claim 1 wherein said zeolite is a zeolite X.

3. The process of claim 1 wherein said zeolite is a zeolite Y.

4. The process of claim 1 wherein said zeolite has a sodium oxide content between about 2 and about 15 %wt.

5. The process of claim 4 wherein said zeolite has a sodium oxide content between about 2.2 and about 13.5 %wt.

6. The process of claim 1 wherein said solution of one or more metal salts contains a metal having a valency of 2, 3 or mixtures thereof.

7. The process of claim 6 wherein said metal salt is selected from the group consisting of magnesium, aluminum, gallium, iron, copper, nickel, manganese, cobalt, zinc and mixtures thereof.

8. The process of claim 7 wherein said metal salt is a gallium salt.

9. The process of claim 7 wherein said metal salt is an aluminum salt.

10. The process of claim 1 wherein an amount of from about 0.01 to about 1.5 mole of multi-valent metal salt per liter of water is used.

11. The process of claim 1 wherein the treated zeolite is dried at a temperature of up to about 200° C.

12. The process of claim 1 wherein the treated, dried or undried, zeolite is subjected to a final calcination at a temperature in the range of from about 350° C. to about 850° C.

13. The process of claim 12 wherein said final calcination is carried out at a temperature in the range betwee about 600° C. and about 750° C.

14. The process of claim 12 wherein following final calcination, a modified zeolite product having a unit cell size between about 24.21 Å and about 24.40 Å is obtained.

15. A catalytically active composition which comprises a modified zeolite having a unit cell size of between about 24.21 Å and about 24.40 Å prepared by the process of claim 1.

16. The catalytically active composition of claim 15 wherein said composition further comprises at least one hydrogenation component of a Group VI metal, at least one hydrogenation component of a Group VIII metal or mixture thereof.

17. The catalytically active composition of claim 15 wherein said composition comprises one or more components selected from the group consisting of nickel, cobalt, and mixtures thereof and one or more components selected from the group consisting of molybdenum, tungsten and mixtures thereof.

18. The catalytically active composition of claim 17 wherein said composition comprises one or more components selected from the group consisting of nickel, cobalt and mixtures thereof and one or more components selected from the group consiting of platinum, palladium and mixtures thereof.

* * * * *